United States Patent
Jung et al.

(10) Patent No.: US 7,817,663 B2
(45) Date of Patent: Oct. 19, 2010

(54) METHOD AND APPARATUS FOR GENERATING PACKET DATA TO SUPPORT MULTIPLE SERVICES IN A WIRELESS PACKET DATA COMMUNICATION SYSTEM

(75) Inventors: Jung-Soo Jung, Seoul (KR); Dae-Gyun Kim, Seongnam-si (KR); Beom-Sik Bae, Suwon-si (KR); Robert J. Marks, Homewood, IL (US)

(73) Assignee: Samsung Electronics Co., Ltd. (KR)

( * ) Notice: Subject to any disclaimer, the term of this patent is extended or adjusted under 35 U.S.C. 154(b) by 966 days.

(21) Appl. No.: 10/890,735

(22) Filed: Jul. 14, 2004

(65) Prior Publication Data

US 2005/0058078 A1 Mar. 17, 2005

(30) Foreign Application Priority Data

Jul. 14, 2003 (KR) .................. 10-2003-0048097
Sep. 9, 2003 (KR) .................. 10-2003-0063346
Oct. 29, 2003 (KR) .................. 10-2003-0076108

(51) Int. Cl.
- *H04J 3/22* (2006.01)
- *H04J 3/24* (2006.01)
- *H04W 4/00* (2009.01)
- *H04B 7/216* (2006.01)

(52) U.S. Cl. .................. 370/466; 370/328; 370/335; 370/342; 370/474

(58) Field of Classification Search .................. None
See application file for complete search history.

(56) References Cited

U.S. PATENT DOCUMENTS 6,370,392 B1 * 4/2002 Li et al. .................. 455/522

(Continued)

FOREIGN PATENT DOCUMENTS

RU 2000110295 A 3/2002

(Continued)

OTHER PUBLICATIONS

Marks, Robert J.; Samsung Electronics Co., Ltd.; Multiplex Option 0×13nn and MuxPDU Type.

(Continued)

*Primary Examiner*—Kwang B Yao
*Assistant Examiner*—Jutai Kao
(74) *Attorney, Agent, or Firm*—The Farrell Law Firm, LLP

(57) ABSTRACT

A packet data generating method and apparatus for supporting multiple services in a wireless packet data communication system where an MS transmits two or more traffics to a BS on one of a reverse PDCH, a reverse FCH, and a reverse DCCH. To generate a PDU using non-signaling traffic and/or signaling traffic for one of the reverse physical channels, a multiplex option is determined during service negotiations between the MS and the BS. The multiplex option defines a traffic format having a header and a payload including traffic data, and the header includes a service reference identifier field, a length indicator field indicating the presence or absence of a length field, and the length field indicating the length of the traffic data. A PDU is generated by formatting a reverse traffic to have a header and a payload according to the determined multiplex option.

14 Claims, 11 Drawing Sheets

| Transmit Rate (bits/sec) | MuxPDU Header | | | Primary Traffic (bits/block) | Signaling Traffic (bits/block) | MuxPDU Type 7 (bits/block) | Permitted on | |
|---|---|---|---|---|---|---|---|---|
| | Mixed Mode (MM) | Traffic Type (TT) | Traffic Type (TM) | | | | FCH | DCCH |
| 9600 | '0' | - | - | 171 | 0 | 0 | Y | Y |
| | '1' | '0' | '00' | 80 | 88 | 0 | Y | Y |
| | '1' | '0' | '01' | 40 | 128 | 0 | Y | Y |
| | '1' | '0' | '10' | 16 | 152 | 0 | Y | Y |
| | '1' | '0' | '11' | 0 | 168 | 0 | Y | Y |
| | '1' | '1' | '00' | 80 | 0 | 88 | Y | Y |
| | '1' | '1' | '01' | 40 | 0 | 128 | Y | Y |
| | '1' | '1' | '10' | 16 | 0 | 152 | Y | Y |
| | '1' | '1' | '11' | 0 | 0 | 168 | Y | Y |
| 4800 | - | - | - | 80 | 0 | 0 | Y | N |
| 2400/2700 | - | - | - | 40 | 0 | 0 | Y | N |
| 1200/1500 | | - | - | 16 | 0 | 0 | Y | N |

U.S. PATENT DOCUMENTS

| | | | |
|---|---|---|---|
| 6,928,289 B1 | 8/2005 | Cho et al. | |
| 7,197,024 B2 * | 3/2007 | Huo | 370/338 |
| 2002/0176362 A1 * | 11/2002 | Yun et al. | 370/236 |
| 2003/0101404 A1 * | 5/2003 | Zhao et al. | 714/755 |
| 2005/0003843 A1 * | 1/2005 | Ho et al. | 455/509 |

FOREIGN PATENT DOCUMENTS

| | | |
|---|---|---|
| WO | WO 99/57848 | 11/1999 |
| WO | WO 00/74344 | 12/2000 |
| WO | WO 02/45279 | 6/2002 |
| WO | WO 03/039057 | 5/2003 |

OTHER PUBLICATIONS

"Medium Access Control (MAC) Standard for cdma2000 Spread Spectrum Systems", Release C, $3^{rd}$ Generation Partnership Project 2 "3GPP2", May 28, 2002.

* cited by examiner

| MuxPDU TYPE 1 | RATE(bps) | HEADER | PRIMARY TRAFFIC (bit/block) | SIGNALING (bit/block) | SECONDARY TRAFFIC (bit/block) |
|---|---|---|---|---|---|
| | 9600 | 0000-1111 | 0 or 171 | 0 or 168 | 0 or 168 |
| | 4800 | - | 80 | 0 | 0 |
| | 2400 | - | 40 | 0 | 0 |
| | 1200 | - | 16 | 0 | 0 |

| MuxPDU TYPE 2 | RATE(bps) | HEADER | PRIMARY TRAFFIC (bit/block) | SIGNALING (bit/block) | SECONDARY TRAFFIC (bit/block) |
|---|---|---|---|---|---|
| | 14400 | 00000-11111 | 0 or 266 | 0 or 262 | 0 |
| | 7200 | 0000-1110 | 0 or 124 | 0 or 121 | 0 |
| | 3600 | 000-111 | 0 or 54 | 0 or 52 | 0 |
| | 1800 | 0-1 | 0 or 20 | 0 | 0 |

| MuxPDU TYPE 3 | SID | RESERVED | TRAFFIC (bit/block) |
|---|---|---|---|
| | 001~111 | 000 | 0-538 |

| MuxPDU TYPE 4 | RATE(bps) | SIGNALING (bit/block) |
|---|---|---|
| | 9600 | 24 |

| MuxPDU TYPE 5 | SID | RESERVED | LENGTH INDICATOR | LENGTH(bit) | TRAFFIC (bit/block) |
|---|---|---|---|---|---|
| | 000-110 | 0 | 00 | - | variable |
| | 000-110 | 0 | 01 | 8 | 8 x LEN +2 |
| | 000-110 | 0 | 10 | 16 | 8 x LEN +2 |
| | 111 | 0 | 11 | - | - |

FIG.2
(PRIOR ART)

| Multiplex Option 0x1 (MuxPDU Type 1) | | | | Multiplex Option 0x2 (MuxPDU Type 2) | | | |
|---|---|---|---|---|---|---|---|
| muxpdu header | primary traffic | signaling traffic | secondary traffic | muxpdu header | primary traffic | signaling traffic | secondary traffic |
| '0' | 171 | 0 | 0 | '0' | 266 | 0 | 0 |
| '1000' | 80 | 88 | 0 | '10000' | 124 | 138 | 0 |
| '1001' | 40 | 128 | 0 | '10001' | 54 | 208 | 0 |
| '1010' | 16 | 152 | 0 | '10010' | 20 | 242 | 0 |
| '1011' | 0 | 168 | 0 | '10011' | 0 | 262 | 0 |
| '1100' | 80 | 0 | 88 | '10100' | 124 | 0 | 138 |
| '1101' | 40 | 0 | 128 | '10101' | 54 | 0 | 208 |
| '1110' | 16 | 0 | 152 | '10110' | 20 | 0 | 242 |
| '1111' | 0 | 0 | 168 | '10111' | 0 | 0 | 262 |
| N/A | 80 | 0 | 0 | '11000' | 20 | 222 | 20 |
| N/A | 40 | 0 | 0 | '0' | 124 | 0 | 0 |
| N/A | 16 | 0 | 0 | '1000' | 54 | 67 | 0 |
| | | | | '1001' | 20 | 101 | 0 |
| | | | | '1010' | 0 | 121 | 0 |
| | | | | '1011' | 54 | 0 | 67 |
| | | | | '1100' | 20 | 0 | 101 |
| | | | | '1101' | 0 | 0 | 121 |
| | | | | '1110' | 20 | 81 | 20 |
| | | | | 0 | 54 | 0 | 0 |
| | | | | '100' | 20 | 32 | 0 |
| | | | | '101' | 0 | 52 | 0 |
| | | | | '110' | 20 | 0 | 32 |
| | | | | '111' | 0 | 0 | 52 |
| | | | | 0 | 20 | 0 | 0 |
| | | | | '1' | 0 | 0 | 20 |

| Rate 1 frame |
|---|
| Rate 1/2 frame |
| Rate 1/4 frame |
| Rate 1/8 frame |

FIG.4
(PRIOR ART)

| MuxPDU Type 7 Header | | |
|---|---|---|
| 3 | 1 | 4 or 5 |
| SR_ID | Format Indicator | Optional Length Field |

General Format of MuxPDU Type 7

FIG.5

| SR_ID | Usage |
|---|---|
| '000' | Signaling |
| '001' - '110' | SR_ID value specified for the service instance |
| '111' | Null service(used when including a Fill MuxPDU) |

FIG.6

| Field Name | Number of Bits | Value |
|---|---|---|
| Rate_Set | 2 | '00' – Not Applicable<br>'01' – Rate Set 1<br>'10' – Rate Set 2 |
| Max_Data_Blocks | 6 | '000000' – No restriction<br>'000001' – '001000' |
| Data_Block_Size | 2 | '00' – Single size<br>'01' – Double size<br>'11' – Variable size |
| MuxPDU_Type | 3 | '000' – MuxPDU Type 1, 2, or 4<br>'010' – MuxPDU Type 3<br>'001' – MuxPDU Type 4 or 6<br>'011' – MuxPDU Type 5<br>'100' – MuxPDU Type 7 |
| Format_Descriptor | 3 | '000' – Format 1 |

Least Significant Bit (top) / Most Significant Bit (bottom)

FIG.8

| Multiplex Option 0X1301 | | | |
|---|---|---|---|
| 1 | 3 | 0 | 1 |
| 0001 | 0011 | 0000 | 0001 |
| 000100 | | | Format 1.MuxPDU Type 7 |
| | 11 | | Variable size data blocks |
| | | 000000 | Variable number of MuxPDUs in a physical SDU |
| | | 01 | Rate Set 1 (9.6Kbps family) |
| Multiplex Option 0X1302 | | | |
| 1 | 3 | 0 | 2 |
| 0001 | 0011 | 0000 | 0010 |
| 000100 | | | Format 1.MuxPDU Type 7 |
| | 11 | | Variable size data blocks |
| | | 000000 | Variable number of MuxPDUs in a physical SDU |
| | | 10 | Rate Set 2 (14.4Kbps family) |

FIG.9

| Transmit Rate (bits/sec) | MuxPDU Header | | | Primary Traffic (bits/block) | Signaling Traffic (bits/block) | MuxPDU Type 7 (bits/block) | Permitted on | |
|---|---|---|---|---|---|---|---|---|
| | Mixed Mode (MM) | Traffic Type (TT) | Traffic Type (TM) | | | | FCH | DCCH |
| 9600 | '0' | - | - | 171 | 0 | 0 | Y | Y |
| | '1' | '0' | '00' | 80 | 88 | 0 | Y | Y |
| | '1' | '0' | '01' | 40 | 128 | 0 | Y | Y |
| | '1' | '0' | '10' | 16 | 152 | 0 | Y | Y |
| | '1' | '0' | '11' | 0 | 168 | 0 | Y | Y |
| | '1' | '1' | '00' | 80 | 0 | 88 | Y | Y |
| | '1' | '1' | '01' | 40 | 0 | 128 | Y | Y |
| | '1' | '1' | '10' | 16 | 0 | 152 | Y | Y |
| | '1' | '1' | '11' | 0 | 0 | 168 | Y | Y |
| 4800 | - | - | - | 80 | 0 | 0 | Y | N |
| 2400/2700 | - | - | - | 40 | 0 | 0 | Y | N |
| 1200/1500 | | - | - | 16 | 0 | 0 | Y | N |

FIG.11A

| Transmit Rate (bits/sec) | MuxPDU Header | | Primary Traffic (bits/block) | Signaling Traffic (bits/block) | MuxPDU Type 7 (bits/block) | Permitted on | |
|---|---|---|---|---|---|---|---|
| | Mixed Mode (MM) | Frame Mode (FM) | | | | FCH | DCCH |
| 14400 | '0' | - | 266 | 0 | 0 | Y | Y |
| | '1' | '0000' | 124 | 138 | 0 | Y | Y |
| | '1' | '0001' | 54 | 208 | 0 | Y | Y |
| | '1' | '0010' | 20 | 242 | 0 | Y | Y |
| | '1' | '0011' | 0 | 262 | 0 | Y | Y |
| | '1' | '0100' | 124 | 0 | 138 | Y | Y |
| | '1' | '0101' | 54 | 0 | 208 | Y | Y |
| | '1' | '0110' | 20 | 0 | 242 | Y | Y |
| | '1' | '0111' | 0 | 0 | 262 | Y | Y |
| 7200 | '0' | - | 124 | 0 | 0 | Y | N |
| | '1' | '000' | 54 | 67 | 0 | Y | N |
| | '1' | '001' | 20 | 101 | 0 | Y | N |
| | '1' | '010' | 0 | 121 | 0 | Y | N |
| 3600 | '0' | - | 54 | 0 | 0 | Y | N |
| | '1' | '00' | 20 | 32 | 0 | Y | N |
| | '1' | '01' | 0 | 52 | 0 | Y | N |
| 1800 | '0' | - | 20 | 0 | 0 | Y | N |

FIG.11B

METHOD AND APPARATUS FOR GENERATING PACKET DATA TO SUPPORT MULTIPLE SERVICES IN A WIRELESS PACKET DATA COMMUNICATION SYSTEM

PRIORITY

This application claims priority under 35 U.S.C. §119 to an application entitled "Method and Apparatus for Generating Packet Data to Support Multiple Services in a Wireless Packet Data Communication System" filed in the Korean Intellectual Property Office on Jul. 14, 2003 and assigned Serial No. 2003-48097 the contents of which are incorporated herein by reference.

BACKGROUND OF THE INVENTION

1. Field of the Invention

The present invention relates generally to a wireless packet data communication system, and in particular, to a packet data generating method and apparatus for supporting the transmission of signaling and control information for multiple services.

2. Description of the Related Art

Typically, the CDMA (Code Division Multiple Access) has evolved from the $2^{nd}$ generation (2G) standards focusing on the voice service to the $3^{rd}$ generation (3G) CDMA standards (CDMA2000) that provide high-speed data service as well as the voice service. The 3G CDMA mobile communication system supports data rates of up to 3 Mbps (Mega bit per second). The 3G CDMA can transmit more data than the 2G CDMA mobile communication system that supports 9.6 kbps or 14.4 kbps. This data transmission capability enables the provisioning of multiple services including high-quality voice service, transmission of moving pictures, Internet browsing, etc.

In the first developed CDMA2000 mobile communication system (CDMA2000 1× system), packet data is transmitted mainly on a supplemental channel (SCH), but voice or signaling information requiring high reliability is to be transmitted on a fundamental channel (FCH) or dedicated control channel (DCCH) because the FCH and DCCH are designed to have a better quality.

An advanced 3G CDMA mobile communication system proposed to simultaneously support voice service and high-speed packet data service, CDMA2000 1×EV-DV (Evolution-Data and Voice) uses a packet data channel (PDCH) to more stably deliver voice and packets at a higher rate. The PDCH, having a channel quality as good as the FCH or DCCH, can deliver information requiring a high transmission probability, for example, signaling information for call control and RLP (Radio Link Protocol) control in CDMA2000 1×EV-DV, along with voice and packet data.

In the CDMA2000 1× and CDMA2000 1×EV-DV systems, the MAC (Media Access Control) layer uses a plurality of MuxPDU (Multiplex sub-layer Protocol Data Unit) types to support a variety of physical channel types. The MuxPDU Types allow MuxPDUs to be generated through the multiplexing of various services.

Conventional PDU generation methods define some available multiplexing methods. Information about the multiplexing method used is written in the header of a PDU. Especially in a PDU for the FCH, signaling traffic and non-signaling traffic (primary and secondary traffic) can be multiplexed only in the methods defined by the standards. At most, the three services, that is, the signaling traffic, the primary traffic and the secondary traffic, can be multiplexed in one PDU.

Along with the recent diverse user demands, provisioning of multiple services through an identical connection has emerged as a significant issue. As described before, however, since up to three types of services can be multiplexed in the conventional PDU generation methods, user-demanded various types of services cannot be supported. Moreover, the multiplexing is available only in the predefined methods, thereby decreasing efficiency in transmitting data of a variable length.

SUMMARY OF THE INVENTION

An object of the present invention is to substantially solve at least the above problems and/or disadvantages and to provide at least the advantages below. Accordingly, an object of the present invention is to provide a method and apparatus for generating a PDU according to the MuxPDU Type supporting a variable length.

Another object of the present invention is to provide a method and apparatus for generating a PDU having in its header a length field to support a variable length.

A further object of the present invention is to provide a method and apparatus for generating a PDU, including in its header a service identifier for identifying a service, in which different types of service data can be multiplexed.

Still another object of the present invention is to provide a method and apparatus for defining a MuxPDU type using a multiplex option to provide multiple services.

The above objects are achieved by providing a method and apparatus for supporting multiple services in a wireless packet data communication system where an MS (mobile station) transmits two or more traffic types to a BS (base station) on one of a reverse PDCH, a reverse FCH, and a reverse DCCH. To generate a PDU using non-signaling traffic and/or signaling traffic for one of the reverse physical channels, a multiplex option is determined during service negotiations between the MS and the BS. The multiplex option defines a traffic format having a header and a payload including traffic data, and the header includes a service reference identifier field, a length indicator field indicating the presence or absence of a length field, and the length field indicating the length of the traffic data. A PDU is generated by formatting a reverse traffic to have a header and a payload according to the determined multiplex option.

BRIEF DESCRIPTION OF THE DRAWINGS

The above and other objects, features and advantages of the present invention will become more apparent from the following detailed description when taken in conjunction with the accompanying drawings in which:

FIG. 2 illustrates the formats of MuxPDU Types in a typical CDMA system;

FIG. 4 illustrates multiplexing methods for MuxPDU Type 1 and MuxPDU Type 2;

FIG. 5 illustrates the format of a PDU of MuxPDU Type 7 according to an embodiment of the present invention;

FIG. 6 illustrates values of SR_ID in the PDU of MuxPDU Type 7 according to the embodiment of the present invention;

FIG. 8 illustrates a rule by which a multiplex option is set for MuxPDU Type 7 according to the embodiment of the present invention;

FIG. 9 illustrates in detail the structures of multiplex options for MuxPDU Type 7 according to the embodiment of the present invention;

FIG. 11A illustrates the format of mixed-mode MuxPDU Type 1 according to another embodiment of the present invention; and FIG. 11B illustrates the format of mixed-mode MuxPDU Type 2 according to the second embodiment of the present invention.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

The present invention pertains to the multiplexing of signaling traffic and non-signaling traffic in the case where three or more services are provided in a wireless packet data communication system. According to the present invention, the header of a PDU includes a length field for supporting a variable length and a service ID field for identifying a service, to thereby adapt to various service situations.

Preferred embodiments of the present invention will be described below in the context of a CDMA2000 system, particularly a CDMA2000 1xEV-DV system proposed by 3GPP2 ($3^{rd}$ Generation Partnership Project 2). Yet, it will be obvious to those skilled in the art that the present invention is applicable to any other mobile communication system based on similar technology and channel structure.

Figure 1:
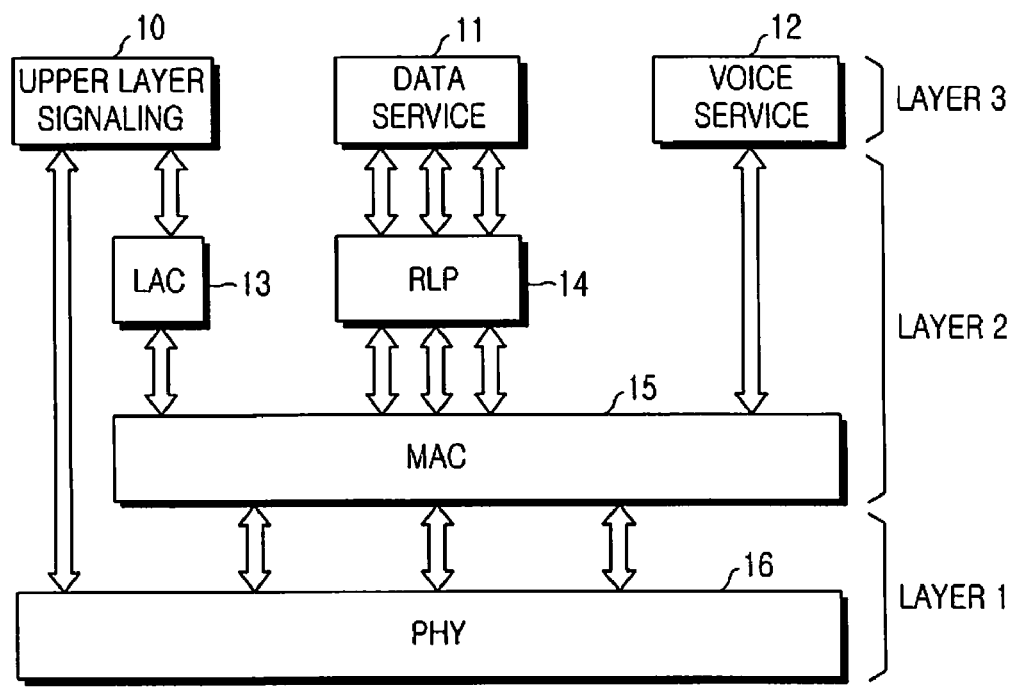
FIG. 1 illustrates a layered protocol architecture in an OSI (Open System Interconnection) reference model of a CDMA system to which the present invention is applied.

FIG. 1 illustrates a layered protocol architecture in an OSI reference model of a CDMA2000 system to which the present invention is applied. The CDMA2000 system is used to refer to both the CDMA2000 1x system and the CDMA2000 1xEV-DV system. The term "layer" used herein refers to software or hardware responsible for performing the functions of a corresponding layer.

Referring to FIG. 1, the CDMA2000 system is composed of an upper signaling layer 10, a data service layer 11, and a voice service layer 12, which correspond to the OSI layer 3 to layer 7. The CDMA2000 system further includes an LAC (Link Access Control) layer 13, an RLP layer 14, and a MAC layer 15 in OSI layer 2, and a PHY (PHYsical) layer 16 in OSI layer 1.

Typically, the CDMA2000 system separates by layers the functionalities of a BS wirelessly connected directly to an MS from those of a base station controller (BSC). That is, the BS takes charge of the functionalities of layer 1, and the BSC takes charge of the functionalities of layer 2 to layer 7.

The upper signaling layer 10 processes signaling information for call control and PHY layer interfacing. The data service layer 11 and the voice service layer 12 process data traffic and voice traffic, respectively.

The LAC layer 13 creates a control message by attaching a header related to authentication, sequencing, and addressing, a report field related to radio link quality, and a length field to signaling information generated from the upper layer signaling layer 10. The LAC layer 13 then segments to a transmittable size for the MAC layer 15 the control message and adds a start of message (SOM) bit indicating the start or continuation of a message to each segment, thereby producing a data unit.

The RLP layer 14 creates a data unit by segmenting to a transmittable size for the PHY layer 16a data stream generated from the data service layer 11 and numbering the segments with sequence numbers. Also, the RLP layer 14 generates a data unit out of control information about a data service in progress in RLP.

The data units generated by both the LAC layer 13 and the RLP layer 14 are called SDUs (Service Datagram Units). An SDU is classified into signaling traffic or non-signaling traffic according to its characteristics. The signaling traffic is a signaling message from the LAC layer 13, and the non-signaling traffic is service data or control information from the RLP layer 14. The non-signaling traffic is further divided into primary traffic and secondary traffic according to its service type.

The MAC layer 15 adds a multiplexing header to an SDU received from the LAC layer 13 or the RLP layer 14 according to the type of a physical channel. The MAC layer 15 has a multiplex sub-layer for multiplexing signaling data and traffic data. A data unit with a multiplexing header is called a Mux-PDU.

The MAC layer 15 constructs a physical channel frame with one or more MuxPDUs according to the type and data rate of a currently connected physical channel and transmits it to the PHY layer 16. The PHY layer 16 processes the physical channel frame by coding, modulation, etc., and transmits the processed frame to another party.

The PHY layer 16 also transmits to the MAC layer 15 at least one PDU included in a physical channel frame received from another party. The MAC layer 15 then extracts an SDU from the at least one PDU by analyzing the header of the PDU and transmits the SDU to a corresponding layer.

Physical channels used for a packet data service in the PHY layer 16 are as follows.

FCH: delivers low-rate traffic data and control information like an existing FCH of IS-95;

SCH: delivers mainly low-rate traffic data like an existing SCH of IS-95; and

PDCH: stably delivers traffic data at high rate.

The MAC layer 15 uses a plurality of MuxPDU Types to support the above different physical channels. The MuxPDU Types will be described with reference to FIG. 2.

FIG. 2 illustrates the formats of MuxPDU Types in a CDMA system. A full rate (rate 1) is 9600 bps, rate ½ is 4800 bps, rate ¼ is 2400 bps, and rate ⅛ is 1200 bps. The data rates determine physical channel frame sizes.

Referring to FIG. 2, MuxPDU Type 1 transmits signaling information, primary traffic and secondary traffic on a physical channel that supports 1200 to 9600 bps. MuxPDU Type 2 supports data rates up to 14400 bps for similar usages to MuxPDU Type 1. Both MuxPDU Type 1 and MuxPDU Type 2 are used to transmit control information and traffic data on the FCH and the DCCH. The primary traffic and secondary traffic are service data, or RLP control information from the RLP layer, discriminated from signaling information for call control from the upper signaling layer. The primary and secondary traffic are separated according to the service type of data or control information.

MuxPDU Type 3 transmits traffic data from the RLP layer on the SCH at or below 14400 bps. MuxPDU Type 4 transmits particular (relatively short) control messages on the FCH.

The size of the payload in a MuxPDU Type 1, 2, 3, and 4 is fixedly determined according to the size of the signaling information or the RLP control information. A receiver can detect the payload size from a received PDU, especially its header. On the other hand, the PDCH proposed for the CDMA2000 1×EV-DV system supports only the MuxPDU Type 5 having a field indicating a payload length in order to support a variable data rate.

MuxPDU Type 5 is used to transmit traffic data from the RLP layer on the PDCH. A PDU of the MuxPDU Type 5 includes a field indicating a payload length.

Figure 3:
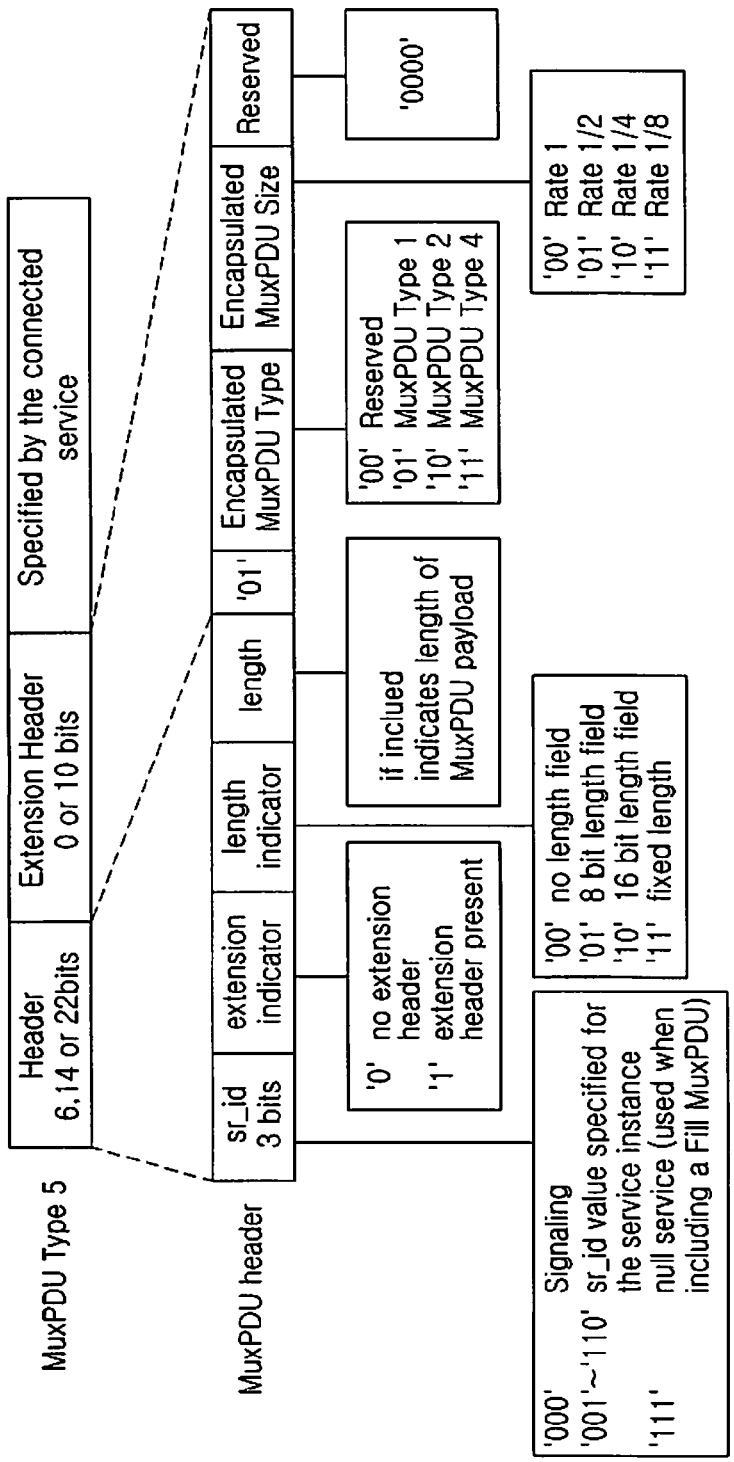
FIG. 3 illustrates in detail the format of a typical PDU of MuxPDU Type 5.

FIG. 3 illustrates the structure of a PDU of MuxPDU Type 5 in detail.

Referring to FIG. 3, the PDU of MuxPDU Type 5 comprises a Header having a length of 6, 14 or 22 bits, a 0- or 10-bit Extension Header, and a Payload.

The Header includes 3-bit SR_ID (Service Reference Identifier), 1-bit Extension Indicator, 2-bit Length Indicator, and Length (LEN) having a length of 0, 8 or 16 bits. The Extension Indicator indicates the presence or absence of the following Extension Header. The Length Indicator indicates the presence or absence of the following LEN and describes the LEN if the LEN exists. The LEN is 8 or 16 bits, representing the length of the Payload in bytes. Thus, the length of the Header of the MuxPDU Type 5 is 6, 14 (8-bit LEN included), or 22 bits (16-bit LEN included).

As to the meaning of the SR_ID, "000" indicates signaling, "001" to "110" indicate service indexes, and "111" indicates a null service. A service index identifies the type of a service maintained through a single call connection. When the Length Indicator is "00", it implies the absence of the LEN. If it is "01", the LEN is 8 bits, if it is 10, the LEN is 16 bits, and if it is "11", the Payload has a fixed length.

The Length Indicator indicates whether or not the following LEN exists and, if the LEN exists, describes the LEN. The LEN provides the length of the Payload in bytes. The Extension Header exists only when the Extension Indicator is 1. The extension header is used to expand the usage of the PDU of the MuxPDU Type 5.

If the Extension Header is "01", it includes a 2-bit Encapsulation MuxPDU Type, 2-bit Encapsulated MuxPDU Size, and a 4-bit Reserved for byte arrangement. The Encapsulation MuxPDU Type, Encapsulated MuxPDU Size, and Reserved are collectively called the Encapsulation Header.

The Encapsulation MuxPDU Type indicates the MuxPDU Type of the following Payload. As for the meaning of the Encapsulation MuxPDU Type, "01" indicates MuxPDU Type 1, "10" indicates MuxPDU Type 2, "11" indicates MuxPDU Type 4, and "00" is a reserved value.

The Encapsulated MuxPDU Size indicates the size of a service unit in the Payload for the FCH supporting the full rate, rate ½, rate ¼ and rate ⅛. That is, "00" indicates the full rate, "01" indicates rate ½, '10" indicates rate ¼, and "11" indicates rate ⅛. For example, when a service unit of the MuxPDU Type 1 for an FCH at the full rate of 9.6 kbps is generated, the size of the service unit is 168 bits.

If the data is transmitted on the FCH or the DCCH, the MuxPDU Type 1, 2 or 4 is used. The MuxPDU Type 4 delivers relatively short data on the FCH or DCCH for a short time of 5 ms. In the MuxPDU Type 4, a PDU is formed with only one SDU, without multiplexing. The MuxPDU Type 1 and the MuxPDU Type 2 allow for signaling traffic and up to two non-signaling traffic (primary and secondary traffic) to be multiplexed in one PDU.

FIG. 4 illustrates multiplexing methods for the MuxPDU Type 1 and the MuxPDU Type 2.

Referring to FIG. 4, the MuxPDU Type 1, with a multiplex option set to "0×1", defines 12 multiplexing methods. For example, for the full rate, a header "1101" indicates a combination of 40-bit primary traffic and 128-bit secondary traffic. The MuxPDU Type 2, with a multiplex option set to "0×2", defines 25 multiplexing methods. For example, for rate ½, a header "1100" indicates a combination of 20-bit primary traffic and 101-bit secondary traffic.

Thus, different traffics are multiplexed in one PDU according to a predetermined multiplexing rule and information about the multiplexing rule is written in the header of the PDU. Due to the preset data sizes, however, this multiplexing method decreases multiplexing efficiency. In order to increase the maximum number of available traffic types to be multiplexed, the size of the header is increased as much as the number of available combinations of the traffic types.

The present invention adopts the MuxPDU Type 7 supporting a variable length to efficiently multiplex the SDUs having diverse characteristics.

FIG. 5 illustrates the structure of a PDU of the MuxPDU Type 7 according to an embodiment of the present invention.

Referring to FIG. 5, the PDU of the MuxPDU Type 7 is composed of a Header and a Payload. The Payload includes at least part of the signaling traffic or the non-signaling traffic. The MuxPDU Type 7 Header includes a 3-bit SR_ID (Service Reference Identifier), a 1-bit Length Indicator indicating the presence or absence of Length, and a 0- or 4-bit Length.

The SR_ID of the MuxPDU Type 7 discriminates the signaling traffic and six different non-signaling traffic, compared to the SR_ID of the MuxPDU Type 5. The values of the SR_ID of the MuxPDU Type 7 will be described below with reference to FIG. 6.

Referring to FIG. 6, the SR_ID identifies signaling traffic by "000" and six different non-signaling traffics by "001" to "110". If the SR_ID is "111", it indicates a null service, implying that the MuxPDU is full. As described above, "001" to "110" of the SR_ID identify packet data services maintained through a single call connection.

The Length Indicator is a 1-bit flag indicating whether the Length field follows. Only when the Length Indicator is "1", the Length is included in the MuxPDU Type 7 Header. The header is a 0- or 4-bit field representing the size in octets of the Payload. The length of the Payload is 2 octets greater than the value of the Length. Thus, the Payload length is set to (Length+2). Since the Payload length is expressed in octets, if a 4-bit Length field is used, 0 to 15 can be represented by 4 bits. As described above, because the Payload length is "Length+2", it can be set to up to 17 bytes (=15+2), namely 136 bits (=17×8).

Figure 7:
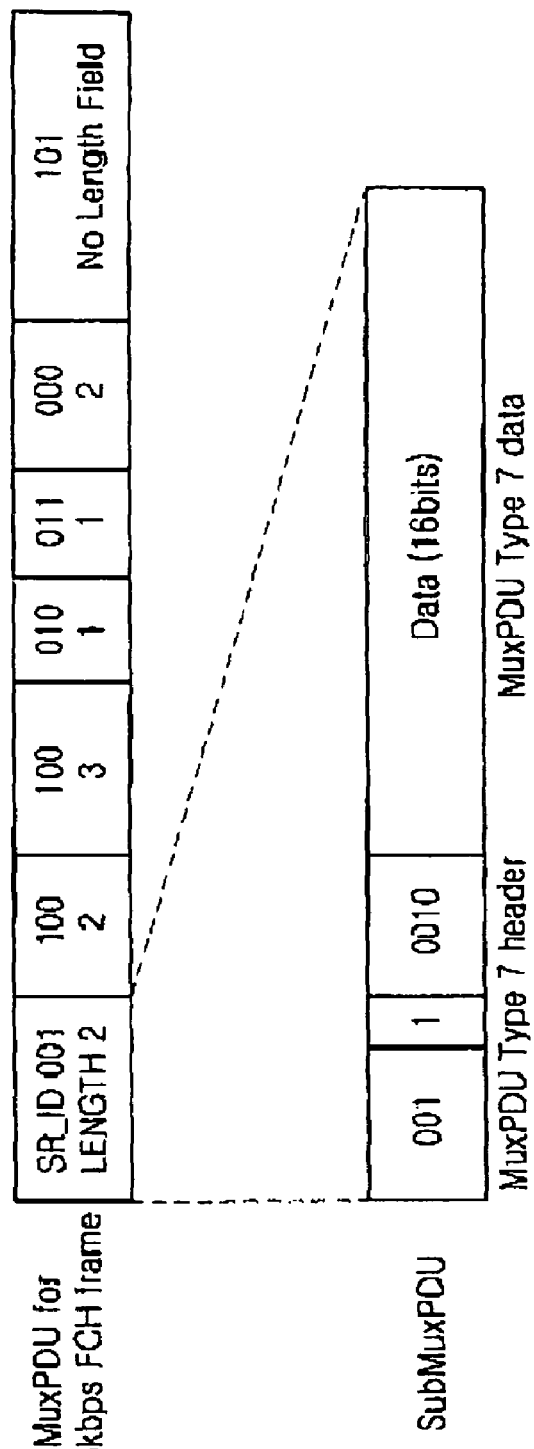
FIG. 7 illustrates the format of an exemplary physical channel frame of MuxPDU Type 7 according to the embodiment of the present invention.

If the Length Indicator is "0", the Length is omitted. Thus, the Header is 4 bits and it is considered that the Payload occupies the remaining physical frame. FIG. 7 illustrates the format of an exemplary MuxPDU Type 7 physical channel frame with six non-signaling traffic and one signaling traffic according to the embodiment of the present invention. The Length is 4 bits and the size of a PDU for a 20-ms FCH frame at 9.6 kbps is 172 bits except a CRC (Cyclic Redundancy Code) for error correction.

Referring to FIG. 7, the 172-bit PDU has six non-signaling traffic and one signaling traffic multiplexed therein. The six non-signaling traffic have SR_ID set to "001"to "110", respectively, and the non-signaling traffic has SR_ID set to "000".

A MuxPDU Type for a physical channel is set according to the multiplex option information exchanged between an MS and a BS during a service setup. The multiplex option information is a value that indicates a set (rate set) of a MuxPDU type, the PDU sizes, and the data rates for a corresponding service. During the service setup, the MS and the BS exchange information about a preset multiplex option, to thereby determine a MuxPDU Type for use during the communications. To use the MuxPDU Type 1 or the MuxPDU Type 2 during the communications, the MS and the BS exchange a multiplex option of "0×01" (rate set 1) or a multiplex option of "0×02" (rate set 2). It is preferable to set a multiplex option greater than "0×10" for the MuxPDU Type 7 of the present invention in order to avoid confusion between the MuxPDU Type 7 and existing other MuxPDU Types. Formation of the multiple option for MuxPDU Type 7 will be described below with reference to FIGS. 8 and 9.

FIG. 8 illustrates a rule by which a multiplex option greater than "0×10" is set according to the embodiment of the present invention.

Referring to FIG. 8, starting with the most significant bit (MSB) of the multiplex option for the MuxPDU type 7, a 3-bit Format_Descriptor describes the format of the multiplex option. It is set to only "000" indicating Format 1. That is, without additionally setting a particular format that discriminates this multiplex option from other multiplex options, only Format 1 is used.

The MuxPDU_Type is 3 bits long to identify the MuxPDU Type 7 from the MuxPDU Type 1 to the MuxPDU Type 6. Therefore, the 3-bit MuxPDU_Type is set to "100" indicating the MuxPDU Type 7.

The following 2-bit field, Data_Block_Size is set to "11" indicating a variable length because the MuxPDU Type 7 has a variable length. The 6-bit Max_Data_Blocks is set to "000000" indicating no limit in the number of blocks, or one of "000001" to "001000". "000001" means that only one block is included in the PDU and "001000" means that eight blocks are included in the PDU. The two least significant bits (LSBs: Rate_Set) indicate a rate set. It is set to "01" for rate set 1 (9.6 kbps family) and "10" for rate set 2 (14.4 kbps family). Hence, final available multiplex options are 0×1301, 0×1302, 0×1305, and 0×1306. Since two values are variable as Rate_Set and Max_Data_Blocks each, a total of four multiplex options become available.

FIG. 9 illustrates in detail the structures of the multiplex options, 0×1301 and 0×1302 from among the final available multiplex options, 0×1301, 0×1302, 0×1305, and 0×1306.

The multiplex option 0×1301 will be described. "1301", which is a hexadecimal number, is equivalent to a binary number "1001100000001". Adding "000" to the binary number results in "0001001100000001".

Referring to FIG. 9, the multiplex option 0×1301 is composed of a Format_Descriptor set to "000" as the MSBs, a MuxPDU_Type set to "100", a Data_Block_Size set to "11", a Max_Data_Blocks set to "000000" indicating the maximum number of MuxPDUs in a physical SDU, and a Rate_Set set to "01". The multiplex option 0×1301 has Rate_Set set to "01" indicating rate set 1 (9.6 kbps family).

Figure 10:
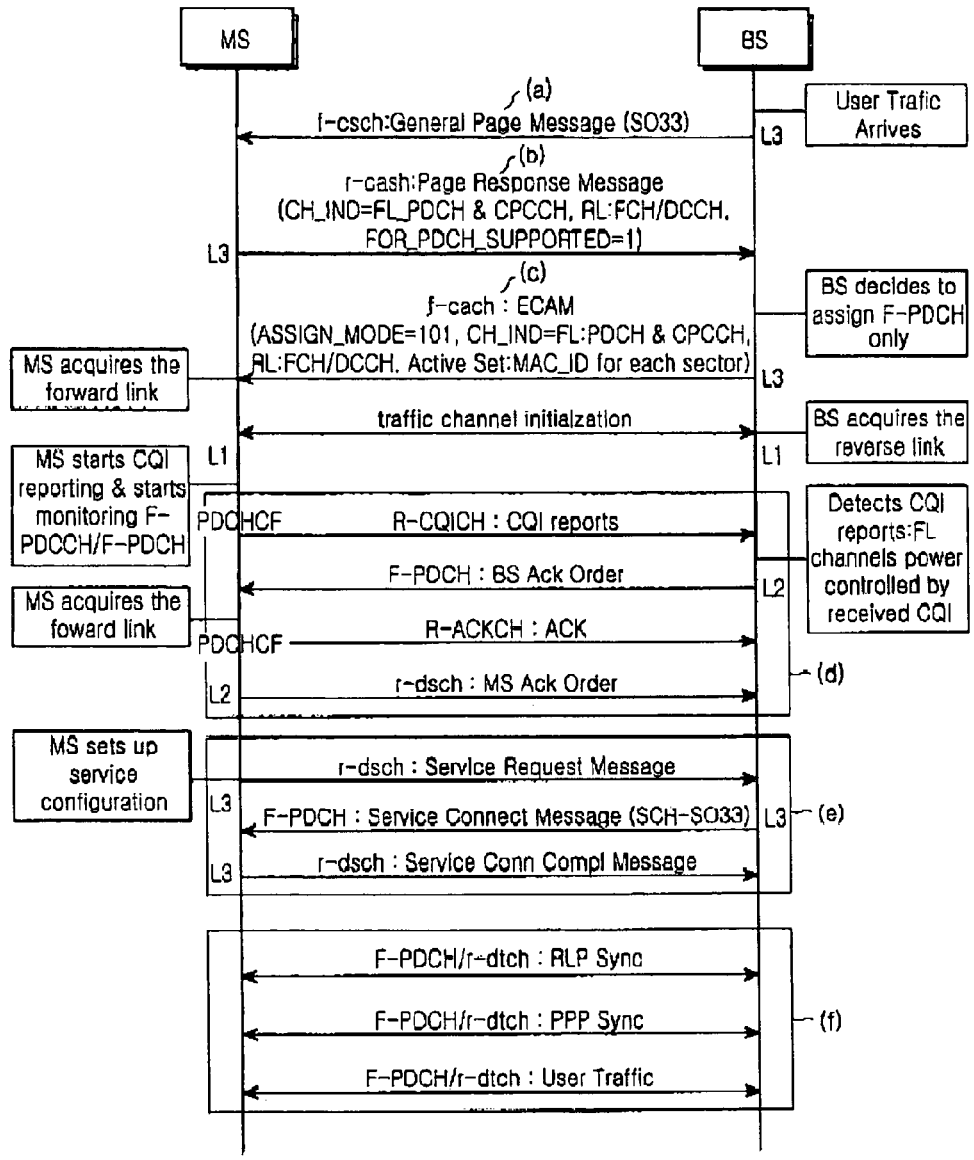
FIG. 10 is a diagram illustrating a signal flow for setting up a call and negotiating a physical channel and a multiplex option between a mobile station (MS) and a base station (BS) according to the embodiment of the present invention.

With reference to FIG. 10, an operation for establishing a call and negotiating a physical channel and a multiplex option between an MS and a BS will be described. While the names and flow of messages related to the establishment of the physical channel and the setting of the multiplex option are shown and described in detail, it is obvious that the details can be changed depending on a system used, system configuration, or operation intention.

Referring to FIG. 10, upon arrival of traffic destined for the MS from a network to the BS, the BS transmits a General Page Message to the MS to establish a call for a packet data service in step (a). In step (b), the MS tells the BS if it accepts the call and which channel it supports by a Page Response Message. The MS supports the PDCH and a common power control channel (CPCCH) on a forward link (FL) and the FCH or DCCH on a reverse link (RL).

In step (c), the transmits to the MS FL and RL channel assignment information by an Extended Channel Assignment Message (ECAM). The MS and the BS acquire the assigned channels in step (d).

In step (e), the MS and the BS set information about a service to be provided by exchanging a Service Request Message, a Service Connect Message, and a Service Connect Complete Message. In the above messages, the MS or the BS sets a service configuration record (SCR) that provides a multiplex option, a physical channel, the size of a physical channel frame, and the radio configuration (RC) information required for the provisioning of the service. The BS or MS determines if the service can be supported as configured in the SCR, by analyzing the SCR and, if it can be supported, transmits the Service Connect Complete Message to the MS or BS.

The MS and the BS establish RLP and PPP (Point-to-Point Protocol) synchronization and exchanges user traffic according to the SCR in step (f).

While the multiplex option of the MuxPDU Type 7 is so configured as not to be identical to other MuxPDU Types in the above embodiment, it is further contemplated as another embodiment that a mixed-mode MuxPDU Types are created by mixing the basic multiplex options, the MuxPDU Type 1 and the MuxPDU Type 2, with the MuxPDU Type 7. The mixed-mode MuxPDU Types will be described with reference to FIGS. 11A and 11B.

FIG. 11A illustrates the format of mixed-mode the MuxPDU Type 1 according to another embodiment of the present invention and FIG. 11B illustrates the format of the mixed-mode MuxPDU Type 2 according to the second embodiment of the present invention.

Referring to FIG. 11A, the mixed-mode MuxPDU Type 1 defines 12 multiplexing methods. Three service types are available: primary traffic, signaling traffic, and the MuxPDU Type 7. These three services are transmitted in one PDU. A Header of the mixed-mode MuxPDU Type 1 includes a Mixed Mode (MM), a Traffic Type (TT), and a Traffic Mode (TM). For example, if MM is "1", TT is "1", and TM is "01" for the full rate (9600 bps), the primary traffic is 40 bits and the MuxPDU Type 7 is 128 bits. According to this setting, the MS combines the traffic in one PDU for transmission.

At the full rate, the FCH and the DCCH are used. At rate ½ (4800 bps), rate ¼ (2400/2700 bps), and rate ⅛ (1200/1500 bps), only the FCH is used without the DCCH and only 80-, 40- and 16-bit primary traffic are available, respectively.

Referring to FIG. 11B, the mixed-mode MuxPDU Type 2 defines 17 multiplexing methods. Three service types are available: primary traffic, signaling traffic, and the MuxPDU Type 7 like mixed-mode MuxPDU Type 1. A Header of the mixed-mode MuxPDU Type 2 includes an MM and a Frame Mode (FM). For example, if the MM is "1" and the FM is "0110" for the full rate (14400 bps), primary traffic is 20 bits and the MuxPDU Type 7 is 242 bits. According to this setting, the MS combines the traffics in one PDU for transmission.

At the full rate, the FCH and the DCCH are used. At rate ½ (7200 bps), rate ¼ (3600/2700 bps), and rate ⅛ (1800 bps), only the FCH is used without the DCCH. If the MM is "1" and the FM is "001" for rate ½ (7200 bps), the primary traffic is 20 bits and the signaling traffic is 101 bits. If the MM is "1" and the FM is "00" for rate ¼ (3600 bps), the primary traffic is 20 bits and the signaling traffic is 32 bits. According to this setting, the MS combines the traffics in one PDU for transmission.

The MS and the BS establish a call and negotiate a physical channel and a multiplex option using the mixed-mode MuxPDU Type I and the mixed-mode MuxPDU Type 2 in the same manner as described with reference to FIG. 10. One thing to note in relation to the mixed-mode MuxPDU Type 1 and the mixed-mode MuxPDU Type 2 is that the MS and the BS must agree on the mixed-mode MuxPDU Type 1 and the mixed-mode MuxPDU Type 2 at a service setup to use the mixed-mode MuxPDU Type 1 and the mixed-mode MuxPDU Type 2.

The major effect of the present invention as described above is that the use of a MuxPDU Type of a variable length, allowing up to seven different services to be multiplexed, easily adapts to various service situations.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method of generating a protocol data unit (PDU) using non-signaling traffic and/or signaling traffic in a wireless packet data communication system, comprising the steps of:
   generating a first PDU by adding a header to a payload according to a specific PDU type, the header including a service reference identifier (sr_id) field for identifying the service type of the traffic, a length indicator field indicating the presence or absence of a length field, and the length field indicating the length of the payload; and
   generating a second PDU comprising primary traffic, signaling traffic, the first PDU, and a header including a mixed-mode MuxPDU type field,
   wherein the mixed-mode MuxPDU type field indicates whether the primary traffic is mixed with at least one of the signaling traffic and the first PDU.

2. The method of claim 1, wherein the step of generating the first PDU comprises omitting the length field if the length indicator field indicates the absence of the length field.

3. The method of claim 1, wherein the length field is 0 or 4 bits.

4. The method of claim 1, further comprising the steps of:
   generating a physical channel frame by connecting one or more PDU; and
   transmitting the physical channel frame on a predetermined channel.

5. The method of claim 4, wherein the predetermined channel is one of a reverse packet data channel, a reverse fundamental channel, and a reverse dedicated control channel.

6. The method of claim 4, wherein the step of generating a physical channel frame comprises the step of generating the physical channel frame such that a last PDU does not contain the length field.

7. The method of claim 1, wherein the first PDU uses a multiplex option having a 3-bit MUXPDU type field for identifying a plurality of muxPDU types, a 3-bit format descriptor field, a 2-bit data block size field, a 6-bit max data blocks field, and a 2-bit rate set field.

8. The method of claim 7, wherein the multiplex option is greater than 0×10.

9. The method of claim 7, wherein the multiplex option is one of 0×1301, 0×1302, 0×1305, and 0×1306.

10. The method of claim 7, wherein the multiplex option is formed according to the table shown in FIG. 8., incorporated herein by reference.

11. The method of claim 1, wherein the service reference identifier of the non-signaling traffic is set to "001" to "110", respectively, and the service reference identifier of the signaling traffic set to "000".

12. An apparatus for generating a protocol data unit (PDU), in a wireless packet data communication system where a mobile station (MS) transmits two or more traffics to a base station (BS) on one of a reverse packet data channel (PDCH), a reverse fundamental channel (FCH), and a reverse dedicated control channel (DCCH), using non-signaling traffic and/or signaling traffic for one of the reverse physical channels, comprising:
   a medium access control (MAC) layer unit for generating a first PDU by adding a header to a payload according to a specific PDU type, the header including a service reference identifier (sr_id) field for identifying the service type of the traffic, a length indicator field indicating the presence or absence of a length field, and the length field indicating the length of the payload, and generating a second PDU comprising primary traffic, signaling traffic, and the first PDU, and a header including a mixed-mode MuxPDU type field; and
   a physical layer unit for generating a physical channel frame by connecting one or more PDUs according to the type and data rate of the reverse physical channel, and transmitting the physical channel frame on the reverse physical channel,
   wherein the mixed-mode MuxPDU type field indicates whether the primary traffic is mixed with at least one of the signaling traffic and the first PDU.

13. The method of claim 12, wherein the mixed-mode muxPDU type is formed according to the table shown in FIG. 11B, incorporated herein by reference.

14. The method of claim 1, wherein the mix-mode muxPDU type is formed according to the table shown in FIG. 11B, incorporated herein by reference.

* * * * *